United States Patent

[11] 3,620,423

| [72] | Inventor | James Dalgleish<br>Edinburgh, Scotland |
|---|---|---|
| [21] | Appl. No. | 844,145 |
| [22] | Filed | July 23, 1969 |
| [45] | Patented | Nov. 16, 1971 |
| [73] | Assignee | Golden Wonder Limited |
| [32] | Priority | July 23, 1968 |
| [33] | | Great Britain |
| [31] | | 35,054/68 |

[54] APPARATUS FOR DISTRIBUTING POWDER
8 Claims, 7 Drawing Figs.

[52] U.S. Cl. .................................................. 222/414,
222/410, 222/412, 118/308, 119/56
[51] Int. Cl. .................................................. G01f 11/20
[50] Field of Search .......................................... 222/412,
410, 414, 367; 119/56; 198/64, 213; 209/233;
64/9; 118/308, DIG. 1

[56] References Cited
UNITED STATES PATENTS

| 3,426,730 | 2/1969 | Lawson et al. ............... | 222/DIG 1 |
| 3,280,973 | 10/1966 | Cartwright et al. ........... | 222/412 |
| 3,221,938 | 12/1965 | Yonkers et al. ............... | 222/DIG. 1 |
| 1,640,907 | 8/1927 | Roderburg ................... | 198/213 |

*Primary Examiner*—Robert B. Reeves
*Assistant Examiner*—James M. Slattery
*Attorney*—Larson, Taylor & Hinds

ABSTRACT: Apparatus for sprinkling a curtain of powder on to food passing beneath and comprising a hopper with a grooved metering roller controlling the discharge from a bottom outlet, wherein the roller has a polished helicoidal groove for picking up the powder.

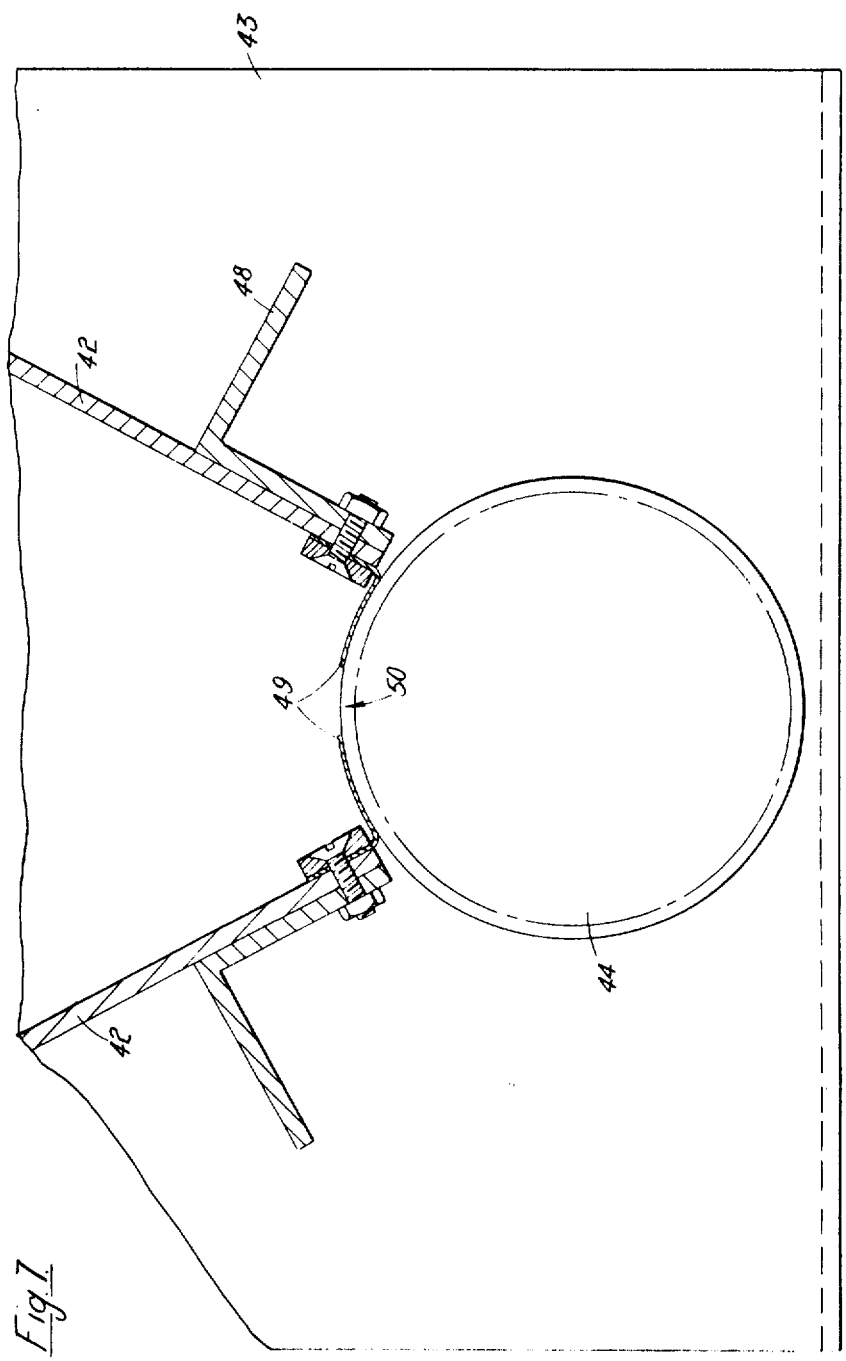

APPARATUS FOR DISTRIBUTING POWDER

This invention relates to apparatus for distributing powder at a metered rate.

For example, the invention may be used to sprinkle common salt onto a stream of potato crisps or to sprinkle granulated sugar onto a moving spread of biscuits or cakes.

According to this invention, apparatus for distributing powder at a metered rate comprises a feed hopper for the powder having a bottom outlet, a roller at the outlet formed with grooving to pick up powder in the hopper and arranged when rotated to meter the discharge of powder through the outlet, and means for scraping powder from the roller surfaces between the grooving before the powder in the grooving is discharged, wherein the roller grooving is of helicoidal form, the surfaces of the grooving are polished and the roller surfaces between the grooving are unpolished.

Preferably the roller grooving is of double helical form and may be of Vee cross section having an included angle of 90°.

Figure 1:
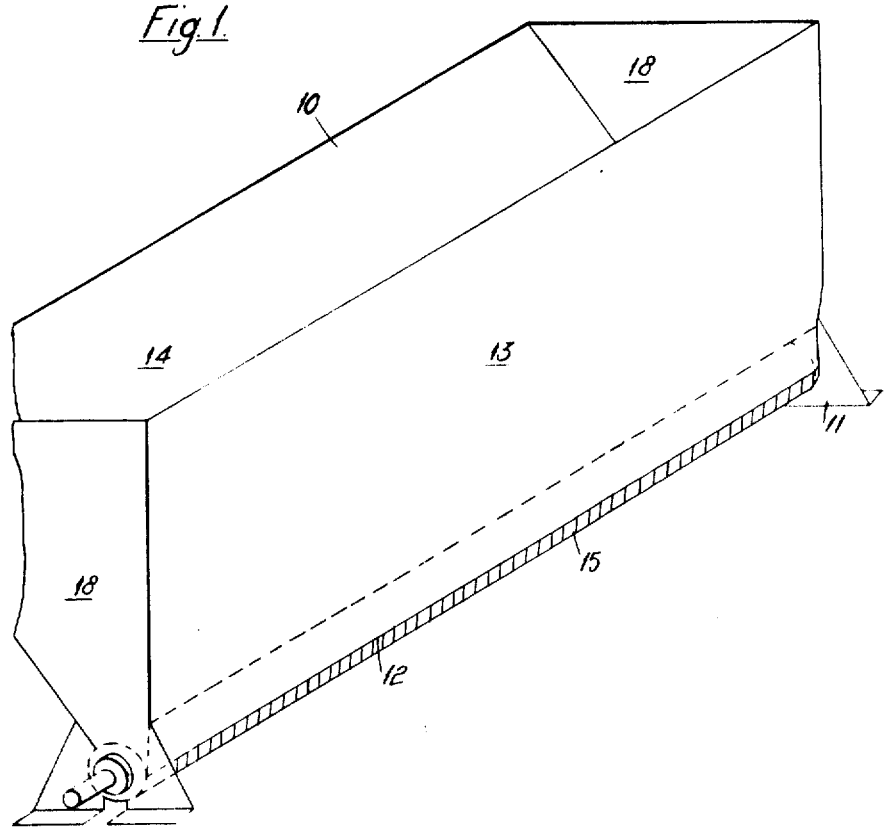
Figure 2:
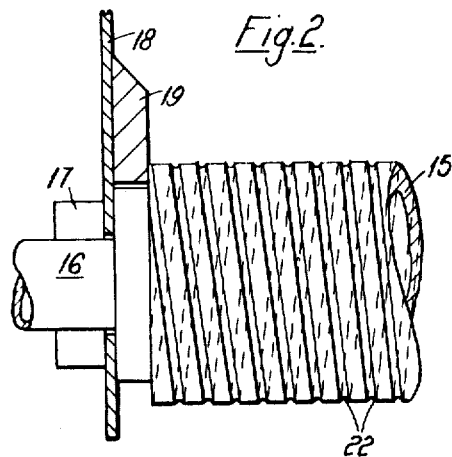
Figure 3:
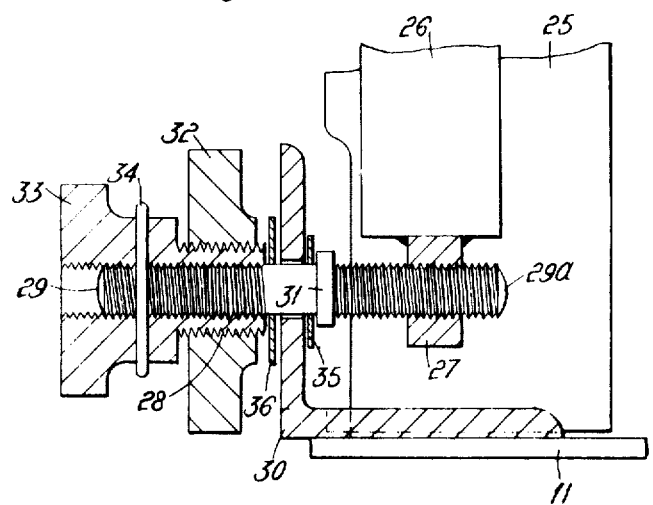
Figure 4:
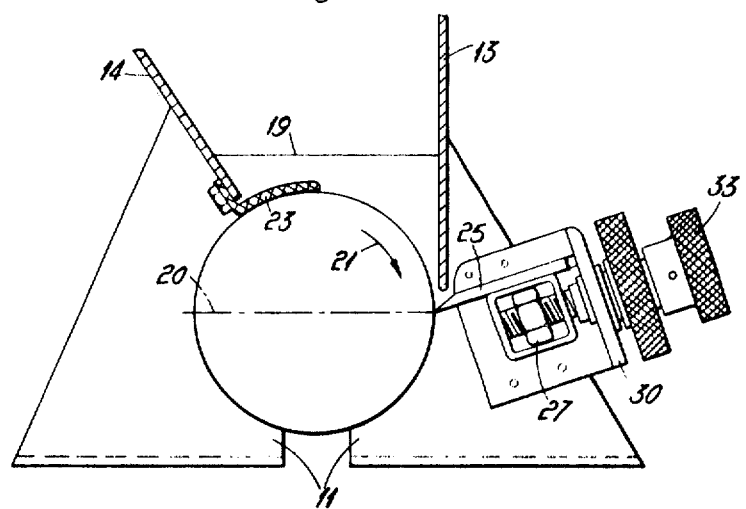
Figure 5:
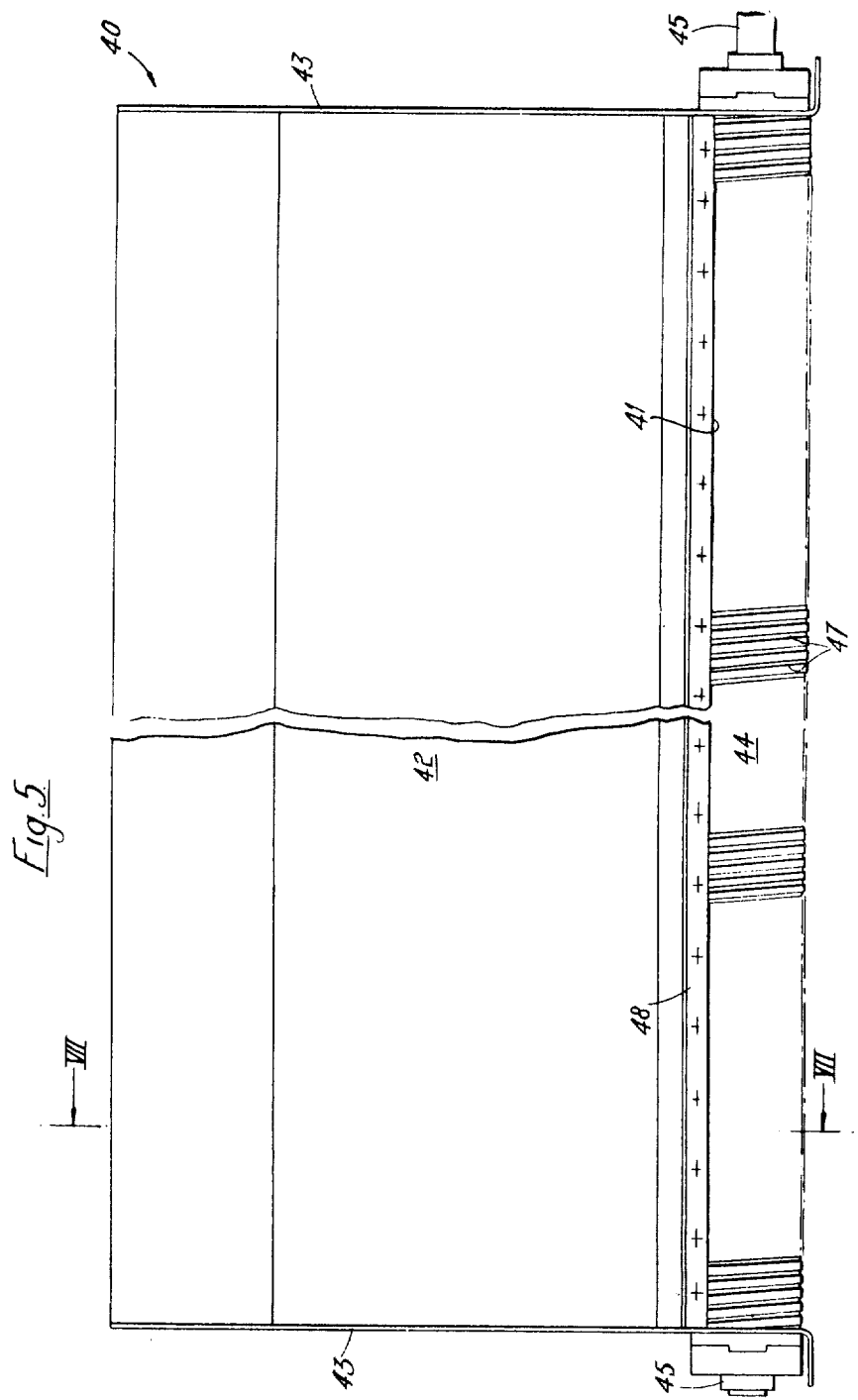
Figure 6:
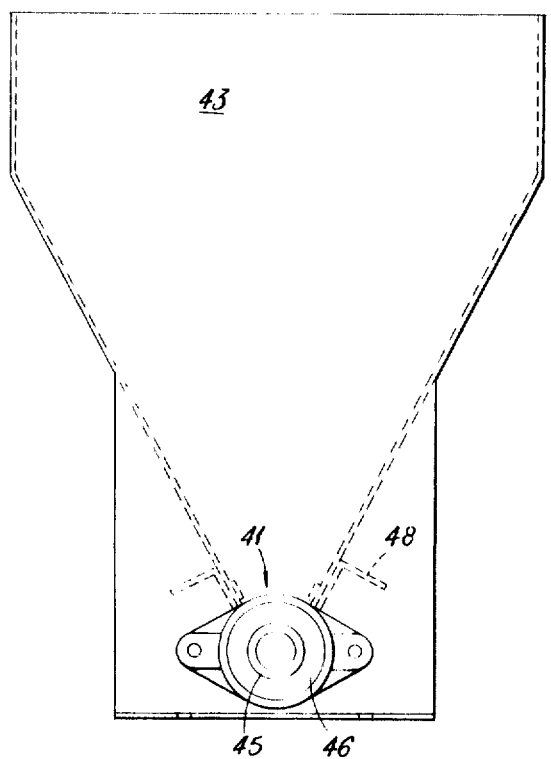

By way of example the invention will now be described with reference to the accompanying drawings of which:

FIG. 1 is a perspective view of a feed hopper provided with a metering roller according to the present invention, FIG. 2 is, on a larger scale, a view of an end portion of the metering roller, FIG. 3 is an inverted plan of an end portion of a doctor blade and shows in section one of two control units for the blade, FIG. 4 is a cross section through the hopper to provide an end view of one of the control units, FIGS. 5 and 6 are respectively a side view and an end view of another embodiment of the invention, and FIG. 7 is, on a larger scale, a cross section taken in the plane VII—VII of FIG. 5.

The illustrated embodiments of the invention are conveniently described with reference to the sprinkling of common salt onto potato crisps.

FIG. 1 shows an elongated hopper 10 for the salt which is provided at either end with flanged members 11 by which it may be mounted above a conveyor belt (not shown) for potato crisps. The hopper has an open top and an elongated bottom outlet 12 defined between a vertical sidewall 13 and an inclined sidewall 14. Located in the outlet 12 is a horizontal metering roller 15 which extends the length of the opening and is mounted by means of stub shafts 16 in bearings 17 at either end carried by the end walls 18 of the hopper. An end seal 19 is provided in the hopper adjacent each bearing. The rotational axis of the roller lies in a horizontal plane 20 and the roller is arranged to be rotated by a motor (not shown) in the direction indicated by feathered arrows 21. One of the flanged members 11 is divided into two spaced-apart halves to permit passage of a stub shaft 16 during removal of the roller.

The cylindrical surface of the metering roller is formed with helicoidal grooving by a double screw thread whose grooves 22 pick up salt fed into the hopper 10. The upstream sidewall 14 which is radial to the rotational axis of the roller supports along its lower edge a flexible rubbing strip 23 which extends the length of the roller and seals against an upstream portion of the crown of the roller. This is to prevent spillage of the salt past the upwardly turning portion of the roller. The downstream sidewall 13 terminates immediately above a scraper device 25 for removing excess salt from the roller. Thus the salt can escape from the hopper only by entering the helicoidal grooves in the roller and being carried round in them past the scraper device. The surfaces of the grooves 22 are polished by any suitable means, e.g. a polishing cloth, to ensure the ready discharge of the salt therefrom but the crests or surfaces of the roller between the grooves are not polished, or alternatively are slightly roughened, so that they will scrape the powder in the hopper and thus ensure that the correct amount is picked up by the grooves. The scraper device 25 comprises a doctor blade with a chamfered edge which is held at each end by a control unit, the blade extending between the hopper end walls 18 and passing immediately below the lower edge of the hopper wall 13 to contact, or nearly contact, the roller at the horizontal plane 20 which includes the roller axis. The blade is stiffened by a longitudinal rib 26 whose ends are each welded to a nut 27. The control units which are similar are used to hold the blade 25 in position, to vary its setting, and to guide it during setting.

Each control unit comprises an inclined operating screw 28 having two spaced sections of screw threads 29 and 29a and a retaining collar 31, a locknut 32 mounted on the screw 28, and a manually operated rotatable control knob 33 which is mounted on the exposed end of the screw thread 29 and secured thereto by a taper pin 34. The screw 28 passes through a plain hole in a supporting bracket 30 which is secured to the adjacent member 11, the collar 31 and nut 32 being located on opposing sides of the hole, to engage the adjacent nut 27 with its inner screw thread section 29a. The screw is also provided with washers, 35, 36. Since the blade 25 is secured to the two screws 29a via the rib 26 and nuts 27, a synchronized rotation of the two knobs 33 will move the blade towards or away from the roller 15, depending on the sense of rotation. The linear movement of the blade is accurately guided by its end portions which slide in inclined guideways provided by the brackets 30.

In a particular example, the roller 15 is of mild steel with a hard chrome surface about 3 feet 7 inches long, 3 5/16 inches diameter, and with a double screw thread of ¾-inch pitch. The polished grooves are of Vee cross section, one-sixteenth inch deep and have an included angle of 90°. The roller speed is between 4 and 100 r.p.m., depending on the desired rate of metering. Such a roller can deliver a pound of powder a minute, assuming a particle size of about 125μ. The doctor blade 15 is also hard chromed and is polished.

The apparatus may be operated in the following manner. Firstly, the knobs 33 are manipulated to give the doctor blade its correct setting for the salt. Then the hopper is loaded with salt, the speed of the roller rotation selected, and the motor started. The conveyor belt carrying the crisps is then started to cause the crisps to pass beneath the roller. During the rotation of the roller, salt in the hopper is picked up in the roller grooves as they pass between the sealing strip 23 and the downstream sidewall 13 and is carried round past the doctor blade 25 to leave the grooves and descend directly in the form of an even curtain across the line of crisps passing beneath the roller.

Because the surfaces of the grooves 22 are polished, the salt readily leaves the grooves after it has passed the doctor blade, thus avoiding any requirement for further removal aids such as brushing or vibrating the powder out of the grooves.

Referring to FIGS. 5 to 7, a feed hopper 40 with an open top and an elongated bottom outlet 41 defined by a pair of convergent sidewalls 42 and a pair of vertical end walls 43 is provided at its outlet with a horizontal metering roller 44. The roller extends the length of the outlet, is mounted by stub shafts 45 in Pollard bearings 46 carried by the end walls 43, and is arranged to be rotated by a motor (not shown) at an r.p.m. which is chosen to suit the salt or other flavorant powder.

The cylindrical surface of the roller is formed with helicoidal grooving 47 provided by a screw thread, preferably a double screw thread. As in the previous embodiment, the surfaces of the grooves 47 must be polished but the crests or surfaces between the grooves are not polished.

Angles 48 are bolted to the external surfaces of the lower portions of the sidewalls 42 to stiffen the walls. The same bolts are used to secure flexible rubbing strips 49 (FIG. 7) to the internal surfaces of the sidewalls 42. The lower portion of each strip 49 is bent inwards through 90° to overlap the adjacent portion of the crown of the roller, the inner edges of the strips terminating short of the vertical plane which contains the roller axis so that they are spaced apart to leave a portion of the crown exposed at station 50 to the powder above in the hopper. The upstream strip 49, according to the direction of rotation of the roller, serves as a sealing strip corresponding to strip 23 in the embodiment of FIG. 4, whereas the downstream strip 49 which faces upstream serves as a scraper device for removing powder from the crests of the roller grooves.

When the roller is rotated, e.g., at a few r.p.m., the salt is picked up in the sections of the grooving 47 as they reach the exposed station 50 and is carried round past the upstream-facing scraper strip 49 to be discharged downwards in the form of an even curtain across a line of crisps passing underneath the roller.

The roller may be of mild steel with a hard chrome surface, the polished helicoidal grooving being of Vee cross section, one-sixteenth inch deep and having an included angle of 90°. The strips 49 may be of nylon.

In this latter embodiment there are no control units to be adjusted to set the scraper device, the rate of discharge depending solely on the roller r.p.m. which is preselected to suit the powder.

I claim

1. Apparatus for distributing powder at a metered rate comprising a feed hopper for the powder having a bottom outlet, a roller at the outlet formed with helicoidal grooving to pick up powder in the hopper, said grooving being smooth and polished, the land area between the grooves being rough and unpolished, said roller being arranged when rotated to meter the discharge of powder through the hopper outlet, and means for scraping powder from the roller surface between the grooving before the grooving is discharged, the device being free from means for removing powder from said grooves during metering of said powder.

2. Apparatus according to claim 1, wherein the roller grooving is of double helical form.

3. Apparatus according to claim 1 and in which the hopper has two opposing sidewalls of which one is adjacent the upstream side of the roller and the other is adjacent the downstream side of the roller, wherein the powder scraping means is a rubbing strip which is mounted from the downstream sidewall and extends inwards to overlap the adjacent portion of the crown of the roller, the inner edge of the strip terminating short of the vertical plane which contains the rotational axis of the roller.

4. Apparatus according to claim 3, wherein a second rubbing strip is mounted from the upstream sidewall and extends inwards to overlap the adjacent portion of the crown of the roller and form a seal therewith, the inner edge of the second strip terminating short of the vertical plane which contains the rotational axis of the roller.

5. Apparatus according to claim 4, wherein stiffeners are secured by bolts to the external surfaces of the sidewalls, the bolts also serving to secure the rubbing strips to the sidewalls.

6. Apparatus according to claim 4, wherein the sidewalls of the hopper converge downwards and the rubbing strips consist of upper portions which are secured to the sidewalls and lower portions which extend inwards to overlap the roller, the lower portions being bent through 90° to overlap the roller.

7. Apparatus according to claim 1, wherein the powder scraping means comprises a doctor blade extending parallel to the roller and supported by longitudinally spaced control units which are adjustable to vary the setting of the doctor blade.

8. Apparatus according to claim 7, and in which the hopper has two opposing sidewalls of which one is adjacent the upstream side of the roller and the other is adjacent the downstream side of the roller, wherein a rubbing strip is mounted from the upstream sidewall and extends inwards to overlap the adjacent portion of the crown of the roller and form a seal therewith.

* * * * *